(12) United States Patent
Even et al.

(10) Patent No.: US 6,605,318 B2
(45) Date of Patent: Aug. 12, 2003

(54) METHOD FOR PROVIDING A POLYMERIC COMPOSITION

(75) Inventors: Ralph Craig Even, Blue Bell, PA (US); Robert Victor Slone, Quakertown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/244,290

(22) Filed: Sep. 16, 2002

(65) Prior Publication Data

US 2003/0113460 A1 Jun. 19, 2003

Related U.S. Application Data

(60) Provisional application No. 60/324,417, filed on Sep. 24, 2001.

(51) Int. Cl.[7] .................................................. B05D 3/02
(52) U.S. Cl. .............................. 427/208.4; 427/385.5; 427/389.9; 427/394
(58) Field of Search ...................... 427/208.4, 385.5, 427/389.9, 394

(56) References Cited

U.S. PATENT DOCUMENTS

| | | | | |
|---|---|---|---|---|
| 2,976,203 | A | | 3/1961 | Young et al. ................ 154/140 |
| 3,238,159 | A | | 3/1966 | Di Benedetti et al. ..... 260/17.4 |
| 3,238,168 | A | | 3/1966 | Wolff et al. ................ 260/29.6 |
| 3,547,847 | A | * | 12/1970 | Levine et al. ................ 524/833 |
| 4,151,146 | A | * | 4/1979 | Patella ........................ 524/833 |
| 4,423,199 | A | * | 12/1983 | Chang et al. .............. 526/307.6 |
| 4,814,373 | A | | 3/1989 | Frankel et al. ............... 524/460 |
| 5,540,987 | A | | 7/1996 | Mudge et al. ................ 428/288 |
| 5,756,574 | A | * | 5/1998 | Baumstark et al. .......... 524/460 |
| 5,998,554 | A | | 12/1999 | Yokoo ......................... 526/201 |
| 6,251,986 | B1 | * | 6/2001 | Ide et al. ..................... 524/547 |
| 6,403,703 | B1 | | 6/2002 | Slone .......................... 524/832 |
| 6,524,656 | B2 | | 2/2003 | Even et al. ............... 427/393.5 |
| 6,545,084 | B2 | | 4/2003 | Brown et al. ................ 524/556 |

FOREIGN PATENT DOCUMENTS

| | | |
|---|---|---|
| EP | 0 832 949 A2 | 9/1997 |
| GB | 959775 * | 6/1964 |

OTHER PUBLICATIONS

U.S. patent application Ser. No. 09/882,024, Even, filed Jun. 18, 2001.
U.S. patent application Ser. No. 09/981,350, Lorah et al., filed Oct. 17, 2001.

* cited by examiner

Primary Examiner—Erma Cameron
(74) Attorney, Agent, or Firm—Ronald D. Bakule

(57) ABSTRACT

A method for providing a caulk, sealant, elastomeric coating, pressure sensitive adhesive, or fabric treatment including: forming an aqueous composition including an aqueous acrylic emulsion polymer, the polymer including, as copolymerized units, 70 to 99.7% by weight, based on dry polymer weight, monoethylenically unsaturated nonionic (meth)acrylic monomer and from 0.3 to 10% by weight, based on dry polymer weight, monoethylenically unsaturated acid monomer, wherein the Tg of the emulsion polymer is from −90 ° C. to lower than −20 C., and wherein at least 40% by weight, based on dry polymer weight, of the polymer is formed by redox polymerization in the presence of 0.0005 to 0.05 moles chain transfer agent per kg dry polymer weight; applying the aqueous composition to a substrate; and drying, or allowing to dry, the applied aqueous composition.

4 Claims, No Drawings

METHOD FOR PROVIDING A POLYMERIC COMPOSITION

This is a non-provisional application of prior pending U.S. provisional application Ser. No. 60/324,417 filed Sep. 24, 2001.

This invention relates to a method for providing an improved caulk, sealant, elastomeric coating, pressure sensitive adhesive, or fabric treatment. More particularly, this invention relates to forming an aqueous composition including an aqueous acrylic emulsion polymer, the polymer including, as copolymerized units, 70 to 99.7% by weight, based on dry polymer weight, monoethylenically unsaturated nonionic (meth)acrylic monomer and from 0.3 to 10% by weight, based on dry polymer weight, monoethylenically unsaturated acid monomer, wherein the Tg of the emulsion polymer is from −90° C. to lower than −20° C., and wherein at least 40% by weight, based on dry polymer weight, of the polymer is formed by redox polymerization in the presence of 0.0005 to 0.05 moles chain transfer agent per kg dry polymer weight; applying the composition to a substrate; and drying, or allowing to dry, the applied composition.

The present invention serves to provide a caulk, sealant, elastomeric coating, pressure sensitive adhesive, or fabric treatment composition including a predominantly acrylic emulsion polymer binder of a certain composition prepared by a certain process which composition exhibits at least one improved property by which is meant herein improved relative to that of a caulk, sealant, elastomeric coating, pressure sensitive adhesive, or fabric treatment which incorporate an acrylic emulsion polymer binder not so constituted and/or prepared.

U.S. Pat. No. 5,540,987 discloses emulsion polymers including at least 50% vinyl acetate having low residual formaldehyde and providing saturated cellulosic webs having improved tensile strength. The polymers are formed by the use of an hydrophobic hydroperoxide and ascorbic acid initiator throughout the course of the reaction.

The present invention serves to provide an improved elastomeric coating, caulk, or sealant, for example improved so as to retain its integrity without cracking under stress, known in the art as crack bridging performance, even at temperatures below 0° C. Elastomeric coatings, caulks, and sealants are frequently applied to buildings and other constructions subjected to outdoor temperature extremes and desirably retain their integrity under such conditions. Also, the present invention serves to provide an improved pressure sensitive adhesive having improved tack which may be desirable in itself or, alternatively, may provide the basis for adjustment of the other adhesives properties such as, for example, the tack/shear balance at an acceptable level of tack. And, the present invention serves to provide an improved fabric treatment. By "fabric treatment" herein is meant, for example, a woven or nonwoven fabric coating, binder (as saturation binder), or adhesive coating (as flocking adhesive).

We have now found that that certain predominantly acrylic emulsion polymer compositions having a Tg of the emulsion polymer from −90° C. to lower than −20° C. prepared wherein at least 40% by weight, based on dry polymer weight, of the emulsion polymer is formed by redox polymerization in the presence of 0.0005 to 0.05 moles chain transfer agent per kg dry polymer provide an improved caulk, sealant, elastomeric coating, pressure sensitive adhesive, or fabric treatment provide at least one improved property.

In a first aspect of the present invention there is provided a method for providing a caulk, sealant, elastomeric coating, pressure sensitive adhesive, or fabric treatment comprising: forming an aqueous composition comprising an aqueous acrylic emulsion polymer, said polymer comprising, as copolymerized units, 70 to 99.7% by weight, based on dry polymer weight, monoethylenically unsaturated nonionic (meth)acrylic monomer and from 0.3 to 10% by weight, based on dry polymer weight, monoethylenically unsaturated acid monomer, wherein the Tg of said emulsion polymer is from −90° C. to lower than −20° C., and wherein at least 40% by weight, based on dry polymer weight, of said polymer is formed by redox polymerization in the presence of 0.0005 to 0.05 moles chain transfer agent per kg dry polymer weight; applying said aqueous composition to a substrate; and drying, or allowing to dry, said applied aqueous composition.

The aqueous acrylic emulsion polymer contains, as copolymerized units, 70 to 99.7% by weight, based on dry polymer weight, monoethylenically-unsaturated nonionic (meth)acrylic monomer including esters, amides, and nitriles of (meth)acrylic acid, such as, for example, (meth) acrylic ester monomer including methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate, aminoalkyl (meth)acrylate, N-alkyl aminoalkyl (meth)acrylate, N,N-dialkyl aminoalkyl (meth)acrylate; urieido (meth)acrylate; (meth)acrylonitrile and (meth)acrylamide. The use of the term "(meth)" followed by another term such as acrylate, acrylonitrile, or acrylamide, as used throughout the disclosure, refers to both acrylate, acrylonitrile, or acrylamide and methacrylate, methacrylonitrile, and methacrylamide, respectively. By "nonionic monomer" herein is meant that the copolymerized monomer residue does not bear an ionic charge between pH=1–14.

The aqueous acrylic emulsion polymer contains, as copolymerized units, from 0.3 to 10% by weight, based on dry polymer weight, monoethylenically-unsaturated acid monomer such as, for example, acrylic acid, methacrylic acid, crotonic acid, itaconic acid, sulfoethyl methacrylate, phosphoethyl methacrylate, fumaric acid, maleic acid, monomethyl itaconate, monomethyl fumarate, monobutyl fumarate, and maleic anhydride. Preferably, the emulsion polymer contains, as copolymerized units, from 0.3 to 2.5% by weight, based on dry polymer weight, (meth)acrylic acid.

The aqueous acrylic emulsion polymer further contains, as copolymerized units, from 0 to 29.4% by weight, based on dry polymer weight, of optional monomers which are neither nonionic monoethylenically-unsaturated nonionic (meth)acrylic monomers nor monoethylenically-unsaturated acid monomers. However, the amount of multiethylenically unsaturated monomers must not exceed, as copolymerized units, 1% by weight, based on dry polymer weight. Optional monomers may include, for example, styrene or alkyl-substituted styrenes; butadiene; vinyl acetate, vinyl propionate, or other vinyl esters; vinyl monomers such as vinyl chloride, vinylidene chloride, and N-vinyl pyrollidone; allyl methacrylate, vinyl toluene, vinyl benzophenone, diallyl phthalate, 1,3-butylene glycol dimethacrylate, 1,6-hexanedioldiacrylate, and divinyl benzene.

The aqueous acrylic emulsion polymer used in this invention is substantially uncrosslinked, when it is applied to a substrate in the method of this invention, although low levels of deliberate or adventitious crosslinking may be present. When low levels of precrosslinking or gel content are desired low levels of optional nonionic multi-ethylenically unsaturated monomers such as, for example, 0.1%–1%, by weight based on the dry polymer weight, may be used. It is important, however, that the quality of the film formation is not materially impaired.

The aqueous acrylic emulsion polymer of this invention is prepared by emulsion polymerization as is well known in the art. Conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer.

A redox initiation system is used. The redox system includes an oxidant and a reductant. One or more oxidants such as, for example, hydrogen peroxide, sodium peroxide, potassium peroxide; t-alkyl hydroperoxide, t-alkyl peroxide, or t-alkyl perester wherein the t-alkyl group includes at least 4 Carbon atoms; cumene hydroperoxide; ammonium and/or alkali metal persulfates; sodium perborate; perphosphoric acid and salts thereof; potassium permanganate; and ammonium or alkali metal salts of peroxydisulfuric acid; typically at a level of 0.01% to 3.0% by weight, based on dry polymer weight, are used. At least one suitable reductant such as, for example, sodium sulfoxylate formaldehyde, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, ascorbic acid, isoascorbic acid, lactic acid, glyceric acid, malic acid, 2-hydroxy-2-sulfinatoacetic acid, tartaric acid and salts of the preceding acids typically at a level of 0.01% to 3.0% by weight, based on dry polymer weight, is used. Redox reaction catalyzing metal salts of iron, copper, manganese, silver, platinum, vanadium, nickel, chromium, palladium, or cobalt may optionally be used. The oxidant and reductant are typically added to the reaction mixture in separate streams, preferably concurrently with the monomer mixture. The polymerization is preferably carried out at pH of 4 to 8.

Further, a chain transfer agent such as, for example, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate in an amount of 0.0005 to 0.05, preferably 0.00125 to 0.025 moles per kg dry polymer weight, more preferably 0.00125 to 0.0125 moles per kg dry polymer weight is used. Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

The reaction temperature is maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof.

In any event, at least 40% by weight, preferably at least 75% by weight, more preferably at least 95% by weight, based on dry polymer weight, of the emulsion polymer is formed by redox polymerization in the presence of 0.0005 to 0.05 moles chain transfer agent per kg dry polymer weight. By "at least 40% by weight, based on dry polymer weight, of the emulsion polymer is formed by redox polymerization in the presence of 0.0005 to 0.05 moles chain transfer agent per kg dry polymer weight" is meant herein that at least 40% by weight, based on dry polymer weight, of the emulsion polymer is formed by redox emulsion polymerization and that this polymerization is effected contemporaneously with the prior presence and/or addition of a total of 0.0005 to 0.05 moles chain transfer agent per kg dry polymer weight. The emulsion polymerization is contemplated to include embodiments where some of the polymer is introduced by a polymer seed, formed in situ or not, or formed during hold periods or formed during periods wherein the monomer feed has ended and residual monomer is being converted to polymer.

In another aspect of the present invention the aqueous acrylic emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases having various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, redox initiation system, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, compositional quantities for a multi-staged polymer particle such as, for example, the amount of nonionic monomer and acid monomer shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

The aqueous acrylic emulsion polymer has an average particle diameter from 20 to 1000 nanometers, preferably from 70 to 300 nanometers. Particle sizes herein are those determined using a Brookhaven Model BI-90 particle sizer manufactured by Brookhaven Instruments Corporation, Holtsville N.Y., reported as "effective diameter". Also contemplated are multimodal particle size emulsion polymers wherein two or more distinct particle sizes or very broad distributions are provided as is taught in U.S Pat. Nos. 5,340,858; 5,350,787; 5,352,720; 4,539,361; and 4,456,726.

The glass transition temperature ("Tg" herein) of the aqueous acrylic emulsion polymer is from −90° C. to lower than −20° C., preferably from −60° C. to lower than −20° C., the monomers and amounts of the monomers being selected to achieve the desired polymer Tg range as is well known in the art. Tgs used herein are those calculated by using the Fox equation (T. G. Fox, Bull. Am. Physics Soc., Vol. 1, Issue No. 3, page 123(1956)), that is, for calculating the Tg of a copolymer of monomers M1 and M2, $$1/Tg(\text{calc.}) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in °K.

The glass transition temperatures of homopolymers may be found, for example, in "Polymer Handbook", edited by J. Brandrup and E. H. Immergut, Interscience Publishers.

The aqueous composition is prepared by techniques which are well known in the coatings art. First, if the elastomeric coating, caulk, sealant, fabric treatment, or pressure sensitive adhesive composition is to be pigmented, at least one pigment is well dispersed in an aqueous medium under high shear such as is afforded by a COWLES® mixer or, for more viscous compositions such as caulks and sealants, a high intensity mixer or mill. Then the aqueous acrylic emulsion polymer is added under lower shear stirring along with other elastomeric coating, caulk, sealant or pressure sensitive adhesive adjuvants as desired. Alternatively, the aqueous acrylic emulsion polymer may be included in the pigment dispersion step. The aqueous composition may contain conventional elastomeric coating, caulk, sealant, fabric treatment, or pressure sensitive adhesive adjuvants such as, for example, tackifiers, pigments, emulsifiers, coalescing agents, buffers, neutralizers, thickeners or rheology modifiers, humectants, wetting agents, biocides, plasticizers, antifoaming agents, colorants, waxes, and anti-oxidants.

The solids content of the aqueous composition may be from about 10% to about 85% by volume. The viscosity of the aqueous composition may be from 0.05 to 2000 Pa.s (50 cps to 2,000,000 cps), as measured using a Brookfield viscometer; the viscosities appropriate for different end uses and application methods vary considerably.

The aqueous composition may be applied by conventional application methods such as, for example, roll coating, doctor-blade application, printing methods, saturation, air-atomized spray, air-assisted spray, airless spray, high volume low pressure spray, air-assisted airless spray, caulk gun, and trowel.

The aqueous composition may be applied to a substrate such as, for example, plastic including sheets and films, wood, metal, previously painted surfaces, woven or non-woven fabric composed of synthetic or cellulosic fibers or mixtures thereof, cementitious substrates, asphaltic substrates or the like, with or without a prior substrate treatment such as an acid etch or corona discharge or a primer.

The aqueous composition coated on the substrate is typically dried, or allowed to dry, at a temperature from 20° C. to 95° C.

The following examples are presented to illustrate the invention The abbreviations listed below are used throughout the examples.

| | |
|---|---|
| AA = | Acrylic Acid |
| BA = | Butyl Acrylate |
| MMA = | Methyl Methacrylate |
| AN = | Acrylonitrile |
| 2-EHA = | 2-Ethylhexyl acrylate |
| n-DDM = | n-Dodecyl Mercaptan |
| SDBS = | Sodium dodecylbenzene sulfonate (23% active) |
| APS = | Ammonium persulfate |
| DI water = | Deionized water |

COMPARATIVE EXAMPLES A–F

Preparation of Emulsion Polymers

The monomers for each example (Table A.1) are combined with 455 g DI water, 4 g sodium carbonate, and 11 g SDBS and emulsified with stirring. 400 g DI water is charged to a 3 L multi-neck flask fitted with mechanical stirring. The flask contents are heated to 85° C. under nitrogen. 3.5 g APS in 10 g DI water is added to the stirred kettle contents. The reaction flask is then charged with 16 g (solids basis) of a 100 nm seed latex with a total of 29 g of DI water. Gradual addition of the monomer emulsion is subsequently initiated. Reactor temperature is maintained at 83° C. throughout the polymerization. 20 g DI water is used to rinse the emulsion feed line to the reactor. After completion of the monomer emulsion addition the reactor is cooled to 60° C. 10 ppm ferrous sulfate, 1 g t-butyl hydroperoxide and 0.5 g D-Isoascorbic acid in aqueous solutions are added. The polymer emulsion is neutralized to pH 7–9 with ammonium hydroxide. For all examples it is expected that the final weight solids of the emulsion will be approximately 50% and the particle size is expected to be approximately 360 nm.

TABLE A.1

Monomer Charges for Comparative Examples A–F.

| EXAMPLE | BA | 2-EHA | MMA | AA | AN | n-DDM |
|---|---|---|---|---|---|---|
| Comp. A | 0 | 765 g | 220 g | 15 g | 0 | 0 |
| Comp. B | 0 | 765 g | 220 g | 15 g | 0 | 1 g |
| Comp. C | 885 g | 0 | 100 g | 15 g | 0 | 0 |
| Comp. D | 885 g | 0 | 100 g | 15 g | 0 | 1 g |
| Comp. E | 915 g | 0 | 0 | 15 g | 70 g | 0 |
| Comp. F | 915 g | 0 | 0 | 15 g | 70 g | 1 g |

EXAMPLES 1–3 and COMPARATIVE EXAMPLES G–I

Preparation of Acrylic Emulsion Polymers

The monomers for each example (Table 1.1) are combined with 400 g DI water, 4 g sodium carbonate, and 11 g SDBS and emulsified with stirring. 380 g DI water is charged to a 3 L multi-neck flask fitted with mechanical stirring. The flask contents are heated to 65° C. under nitrogen. To the stirred flask contents are added 0.02 g ferrous sulfate heptahydrate and 0.02 g tetrasodium salt of ethylenediamine-tetraacetic acid in 15.6 g DI water. The reaction flask is then charged with 16 g (solids basis) of a 100 nm seed latex with a total of 29 g of DI water. Gradual addition of the monomer emulsion is subsequently begun. Separate solutions of 2.9 g APS in 50 g DI water and 1 g of D-Isoascorbic acid in 50 g DI water are fed concurrently with the monomer emulsion. Reactor temperature is maintained at 65° C. throughout the polymerization. 20 g DI water is used to rinse the emulsion feed line to the reactor. After completion of the monomer emulsion addition the reactor is cooled to 60° C. 10 ppm ferrous sulfate, 1 g t-butyl hydroperoxide and 0.5 g D-Isoascorbic acid in aqueous solutions were added. The polymer emulsion is neutralized to pH 7–9 with ammonium hydroxide. For all examples it is expected that the final weight solids of the emulsion will be approximately 50% and the particle size is expected to be approximately 360 nm.

TABLE 1.1

Monomer Charges for Examples 1–3 and Comp. Examples G–I

| EXAMPLE | BA | 2-EHA | MMA | AA | AN | n-DDM |
|---|---|---|---|---|---|---|
| Comp. G | 0 | 765 g | 220 g | 15 g | 0 | 0 |
| 1 | 0 | 765 g | 220 g | 15 g | 0 | 1 g |
| Comp. H | 885 g | 0 | 100 g | 15 g | 0 | 0 |
| 2 | 885 g | 0 | 100 g | 15 g | 0 | 1 g |
| Comp. I | 915 g | 0 | 0 | 15 g | 70 g | 0 |
| 3 | 915 g | 0 | 0 | 15 g | 70 g | 1 g |

EXAMPLE 4

Preparation of Aqueous Compositions and Evaluation of Elastomeric Coatings.

Aqueous compositions are made using the following ingredients, added in the order given.:

| Ingredients | Amount (g) |
|---|---|
| Water | 106.77 |
| TAMOL ™ 731[1] | 12.28 |
| Potassium tripolyphosphate | 3.1 |
| NOPCO ™ NXZ[2] | 7.2 |
| ACRYSOL ™ RM 8W[1] | 17.7 |
| Propylene Glycol | 20.0 |
| TIOXIDE ™ TR-92[3] | 100.0 |
| DURCAL ™ 5[4] | 447.3 |
| Butyl CARBITOL ™[5] | 13.6 |

The ingredients are mixed using a high shear Cowles mixer and 500 g of emulsion polymer is added with stirring.
[1]Trademark of Rohm and Haas Company.
[2]Trademark of Diamond Shamrock Chemical Company.
[3]Trademark of Tioxide Europe Ltd.
[4]Trademark of OMYA, Inc.
[5]Trademark of Union Carbide Chemical Co, Crack bridging, the ability to maintain film integrity while spanning a crack which may vary in width with changes in environmental conditions, is an important performance attribute of elastomeric coatings. One tool for predicting crack bridging performance is measuring the toughness of the formulated elastomeric coating. Toughness reflects the ability of the film to stretch and recover in response to dimensional instability of the substrate to which it is applied. Greater toughness is therefore indicative of superior crack bridging performance.

The aqueous compositions are coated at equal volume on release paper at 1 mm wet thickness and are dried for 23 days (at 25° C. and 50% relative humidity). Dumbbell shaped specimens having a neck width of 10 mm and a neck length of 30 mm are cut out. The thickness of each sample is measured at its neck with a micrometer. Toughness is determined using the Tinius Olsen UTM (Model No. HLOK-S, Tinius Olsen Testing Machine Co., Inc., Willow Grove, Pa.). The controlled temperature chamber is set at −10° C. Samples are clamped into the jaws of the instrument and allowed to equilibrate to the test temperature. The separation speed of the jaws is set at 5.08 cm/min (2 inch/min). As the jaws separate the instrument generates a stress/strain curve. Toughness is defined as the area under the curve from the onset of stress to the point of maximum stress.

An elastomeric coating of the present invention containing the emulsion polymer of Example 1 exhibits greater toughness relative to the elastomeric coatings containing the emulsion polymers of Comparative Examples A, B, or G. An elastomeric coating of the present invention containing the emulsion polymer of Example 2 exhibits greater toughness relative to the elastomeric coatings containing the emulsion polymers of Comparative Examples C, D, or H. An elastomeric coating of the present invention containing the emulsion polymer of Example 3 exhibits greater toughness relative to the elastomeric coatings containing the emulsion polymers of Comparative Examples E, F, or I.

EXAMPLE 5

Evaluation of Aqueous Compositions as Pressure Sensitive Adhesives

Dried films of the emulsion polymers are tested according to the following methods.

Peel: PSTC-1 Peel Adhesion of Single Coated Pressure Sensitive Tapes at 180° Angle (PSTC=Pressure Sensitive Tape Council, 401 N. Michigan Avenue, #00, Chicago, Ill. 60611), adhesive applied to stainless steel.

Loop Tack: ASTM D6195 Standard Test Methods for Loop Tack Shear: ASTM D6463 Standard Test Methods for Time to Failure of Pressure Sensitive Articles under Sustained Shear Loading.

It is expected that the pressure sensitive adhesive, dried emulsion polymer of Example 1, of this invention will exhibit improved tack relative to that of Comparative Examples A, B or G. It is expected that the pressure sensitive adhesive, dried emulsion polymer of Example 2, of this invention will exhibit improved tack relative to that of Comparative Examples C, D and H. It is expected that the pressure sensitive adhesive, dried emulsion polymer of Example 3, of this invention will exhibit improved tack relative to that of Comparative Examples E, F and I.

What is claimed is:

1. A method for providing a caulk, sealant, elastomeric coating, pressure sensitive adhesive, or fabric treatment comprising:

a) forming an aqueous composition comprising an aqueous acrylic emulsion polymer, said polymer comprising, as copolymerized units, 70 to 99.7% by weight, based on dry polymer weight, monoethylenically unsaturated nonionic (meth)acrylic monomer and from 0.3 to 10% by weight, based on dry polymer weight, monoethylenically unsaturated acid monomer, wherein the Tg of said emulsion polymer is from −90° C. to lower than −20° C., and wherein at least 40% by weight, based on dry polymer weight, of said polymer is formed by redox polymerization in the presence of 0.0005 to 0.05 moles chain transfer agent per kg dry polymer weight;

b) applying said aqueous composition to a substrate; and c) drying, or allowing to dry, said applied aqueous composition.

2. The method of claim 1 wherein said redox polymerization is effected in the presence of 0.00125 to 0.025 moles chain transfer agent per kg dry polymer weight.

3. The method of claim 1 wherein said redox polymerization is effected in the presence of 0.00125 to 0.0125 moles chain transfer agent per kg dry polymer weight.

4. The method of claim 1, 2, or 3 wherein said redox polymerization is effected at a pH of 4 to 8.

* * * * *